(12) United States Patent
Ohmura et al.

(10) Patent No.: US 6,270,922 B1
(45) Date of Patent: Aug. 7, 2001

(54) SURFACE-TREATED STEEL PLATE FOR BATTERY CASE, BATTERY CASE AND BATTERY USING THE CASE

(75) Inventors: Hitoshi Ohmura; Tatsuo Tomomori; Hideo Ohmura, all of Yamaguchi (JP)

(73) Assignee: Toyo Kohan Co., Ltd., Tokyo (JP)

(*) Notice: Subject to any disclaimer, the term of this patent is extended or adjusted under 35 U.S.C. 154(b) by 0 days.

(21) Appl. No.: 09/254,274
(22) PCT Filed: Sep. 2, 1997
(86) PCT No.: PCT/JP97/03072
§ 371 Date: Jun. 16, 1999
§ 102(e) Date: Jun. 16, 1999
(87) PCT Pub. No.: WO98/10475
PCT Pub. Date: Mar. 12, 1998

(30) Foreign Application Priority Data

Sep. 3, 1996 (JP) .................................... 8-250853

(51) Int. Cl.[7] .................................................. H01M 2/02
(52) U.S. Cl. .......................... 429/176; 428/610; 428/647; 428/679; 428/680; 429/163
(58) Field of Search .................................... 429/176, 163; 428/610, 679, 680, 647

(56) References Cited

U.S. PATENT DOCUMENTS

| | | |
|---|---|---|
| 4,910,096 | 3/1990 | Junkers et al. . |
| 5,587,248 | * 12/1996 | Ohmura et al. ........................ 428/610 |
| 5,679,181 | 10/1997 | Ohmura et al. . |
| 6,087,040 | * 7/2000 | Ohmura et al. ........................ 429/176 |

FOREIGN PATENT DOCUMENTS

| | | | |
|---|---|---|---|
| 0 944 123 | * | 9/1999 | (EP) . |
| 62104 | | 1/1994 | (JP) . |
| 6-108286 | | 4/1994 | (JP) . |
| 799686 | | 10/1995 | (JP) . |
| 7-300695 | | 11/1995 | (JP) . |
| 9511527 | | 4/1995 | (WO) . |

* cited by examiner

Primary Examiner—Archene Turner
(74) Attorney, Agent, or Firm—Browdy and Neimark

(57) ABSTRACT

The present invention aims to produce the material for a battery container having the improved battery performance, wherein the internal resistance caused by contacting with the positive electrode mix is remarkably reduced and the corrosion resistance is excellent. It also aims to produce the material, wherein powdering is reduced at the inner surface of the battery container during forming. Furthermore, it aims to produce a battery container manufactured using the material and a battery manufactured using the battery container.

The surface treated steel sheet of the present invention for a battery container is comprising a steel substrate on which one side to be the inner surface of the battery container nickel- tin-iron diffusion layer is formed on the uppermost surface. On the side to be the outer surface of the battery container nickel-cobalt-iron diffusion layer is formed on the uppermost surface. Further, on the inner surface of the battery container manufactured by drawing and soon, the nickel-tin-iron diffusion layer is formed, while on the outer surface of it nickel-cobalt-iron diffusion layer is formed. In addition, a battery is manufactured packing the active material into this battery container.

5 Claims, 1 Drawing Sheet

SURFACE-TREATED STEEL PLATE FOR BATTERY CASE, BATTERY CASE AND BATTERY USING THE CASE

FIELD OF THE INVENTION

The present invention relates to a surface treated steel sheet for battery container, a battery container and a battery using same.

PRIOR ART

For manufacturing a battery container in which strong alkaline solution is packed, like a primary battery such as alkali-manganese batteries and a secondary battery such as nickel cadium batteries and nickel-hydrogen battery of which extensive demand is expected, a method of barrel plating, after press forming cold-rolled steel strip into a battery container, the so-called post-plating, or a method of press forming nickel-plating steel strip into a battery container, the so-called pre-plating, have been adopted. From these points of view, the inventors of the present application previously proposed a surface treated steel sheet having low internal resistance which is excellent for a battery container (WO 95/11527).

Further recently, a DI (drawing and ironing) forming method is increasingly used as a method of thinning wall to increase the capacity of the battery replacing the multi step deep drawing method (Published Japanese Patent Hei 7-99686). This DI forming method and DTR (drawing thin and redraw) forming method is capable of increasing the battery capacity because the container side wall being thinner than the bottom thickness allows more positive electrode and negative electrode active materials to be contained. Moreover, the thick bottom has an advantage to improve the pressure resistance of the battery. Incidentally, although the DI forming method and the DTR forming method are effective for increasing the battery capacity as mentioned above, there is a disadvantage in the continuous forming method because the deformation resistance of the material in these methods is greater than that in the conventional multi step deep-drawing forming method. Concretely, when the powdering quality (powdery dropout of the plating layer) in the cupping process of the DI forming method and the DTR forming method is inferior, the powder adheres to the die and the punch during the ironing process causing a defect in the container side wall. Although a similar phenomenon happens in the deep-drawing forming, the above-mentioned defect is more remarkable in the DI forming method and the DTR forming method because the container wall has small surface roughness and has more lustrous appearance. Thus, powdering quality is more critical in the DI forming method and the DTR forming method. Also, because the contact pressure of the material with the tool is greater in the DI forming method and the DTR forming method than that in the drawing method, favorable lubrication is required for tool duration. Therefore, materials which have a favorable powdering quality are required.

For the surface to be the outside of a battery container, as-plated steel sheet by the gloss nickel plating has conventionally been adopted. However, said gloss nickel-plating has inferior powdering quality during the press-forming. In addition, since gloss plating involves organic additives containing sulfur (for example, sulfonic acid having=C—$SO_2$-group) to make electrolytically deposited crystal grains fine, sulfur is absorbed in the plating layer during electroplating, which causes the em-brittlement with sulfur promoted by the temperature rise of the material in the ironing and the stretching process of the DI forming and the DTR forming resulting in a deteriorated powdering quality.

The present invention is based on such findings and it is aimed to provide a battery container having a surface treated layer with low internal resistance at the inner surface of it and high quality and yet excellent continuous formability at the outer surface of it. And it is further aimed at a surface treated steel sheet which is suitable for producing the said battery container. Another objective of the present invention is to improve the removability of container (strippability) after the DI forming and the DTR forming. This is taken into consideration since the difficult of stripping the container from the punch (strippability) in the final pressing process is critical in the container manufacturing in addition to the above-mentioned powdering quality. At stripping, where the container is pulled out from the punch by hitching fingernails on the edge of the container, there has been a problem that an inferior stripping would cause breaking or tearing at the open end portion of the container, which deteriorated the productivity.

DISCLOSURE OF THE INVENTION

In a battery container described in claim 1, an iron-nickel-tin diffusion layer is formed on the inner surface and an iron-nickel-cobalt diffusion layer is formed on the outer surface.

In a battery container described in claim 2, a nickel-tin diffusion layer is formed as the uppermost layer and a nickel layer is formed under said nickel-tin diffusion layer on the inner surface, and a nickel-cobalt diffusion layer is formed as the uppermost layer and a nickel layer is formed under said nickel-cobalt diffusion layer on the outer surface.

In a battery container described in claim 3, a nickel-tin diffusion layer is formed as the uppermost layer, a nickel layer is formed as the intermediate layer and an iron-nickel diffusion layer is formed as the lowermost layer on the inner surface, and a nickel-cobalt diffusion layer is formed as the uppermost layer, a nickel layer is formed as the intermediate layer and an iron-nickel diffusion layer is formed as the lowermost layer on the outer surface.

In a battery container described in claim 4, a nickel-tin diffusion layer is formed as the uppermost layer and an iron-nickel diffusion layer is formed under said nickel-tin diffusion layer on the inner surface, a nickel-cobalt diffusion layer is formed as the uppermost layer and an iron-nickel diffusion layer is formed under said nickel-cobalt diffusion layer on the outer surface.

In a battery container described in claim 5, a nickel-tin diffusion layer is formed as the uppermost surface, an iron-nickel-tin diffusion layer is formed as the intermediate layer and an iron-nickel diffusion layer is formed as the lowermost layer on the inner surface, and a nickel-cobalt diffusion layer is formed as the uppermost layer, an iron-nickel-cobalt diffusion layer is formed as the intermediate layer and an iron-nickel diffusion layer is formed as the lowermost layer on the outer surface.

A battery container described in claim 6 is one according to any of claim 1 to 5 which is manufactured using drawing, DI forming or DTR forming.

In a surface treated steel sheet for a battery container described in claim 7, an iron-nickel-tin diffusion layer is formed on the one side of said steel sheet, that is to be the inner surface of the battery container, and an iron-nickel-cobalt diffusion layer is formed on the other side of said steel sheet, that is to be the outer surface of the battery container.

In a surface treated steel sheet for a battery container described in claim 8, a nickel-tin diffusion layer is formed as the uppermost layer, a nickel layer is formed under said a nickel-tin diffusion layer on the one side of said steel sheet, that is to be the inner surface of the battery container, and a nickel-cobalt diffusion layer is formed and nickel layer is formed under said nickel-cobalt diffusion layer on the other side of said steel sheet, that is to be the outer surface of the battery container.

In a surface treated steel sheet for a battery container described in claim 9, a nickel-tin diffusion layer is formed as the uppermost layer, a nickel layer is formed as the intermediate layer and an iron-nickel diffusion layer is formed as the lowermost layer on the one side of said steel sheet, that is to be the inner surface of the battery container, and nickel-cobalt diffusion layer is formed as the uppermost surface, a nickel layer is formed as the intermediate layer and an iron-nickel diffusion layer is formed as the lowermost layer on other side of said steel sheet, that is to be the outer surface of the battery container.

In a surface treated steel sheet for a battery container described in claim 10, a nickel-tin diffusion layer is formed as the uppermost layer, and an iron-nickel diffusion layer is formed under said nickel-tin diffusion layer on the one side of said steel sheet, that is to be the inner surface of the battery container, and a nickel-cobalt diffusion layer is formed, and further an iron-nickel diffusion layer is formed under said nickel-cobalt diffusion layer on the other side of said steel sheet, that is to be the outer surface of the battery container.

In a surface treated steel sheet for a battery container described in claim 11, a nickel-tin diffusion layer is formed as the uppermost layer, an iron-nickel-tin diffusion layer is formed as the intermediate layer and an iron-nickel diffusion layer is formed as the lowermost layer of the one side of said steel sheet, that is to be the inner surface of the battery container, and a nickel-cobalt diffusion layer is formed as the uppermost surface, and iron-nickel-cobalt diffusion layer is formed as the intermediate layer and an iron-nickel diffusion layer is formed as the lowermost layer of other side of said steel sheet, that is to be the outer surface of the battery container.

A battery described in claim 12 is one using any battery container as claimed in claim 1 to 6 into which positive electrode mix and negative active material are packed.

In a manufacturing method of a surface treated steel sheet for a battery container described in claim 13, nickel is plated on both sides of a cold rolled steel sheet, then nickel-cobalt alloy is plated on the side to be the outer surface of the battery container, and then tin is plated on the side to be the inner surface of the battery container followed by subsequent heat treatment.

In a manufacturing method of a surface treated steel sheet for a battery container described in claim 14, nickel is plated on both sides of a cold rolled steel sheet, then nickel-cobalt alloy is plated on the side to be the outer surface of the battery container, and then nickel-tin alloy is plated on both sides followed by subsequent heat treatment.

THE BEST MANNER REALIZING THE PRESENT INVENTION

Figure 1:
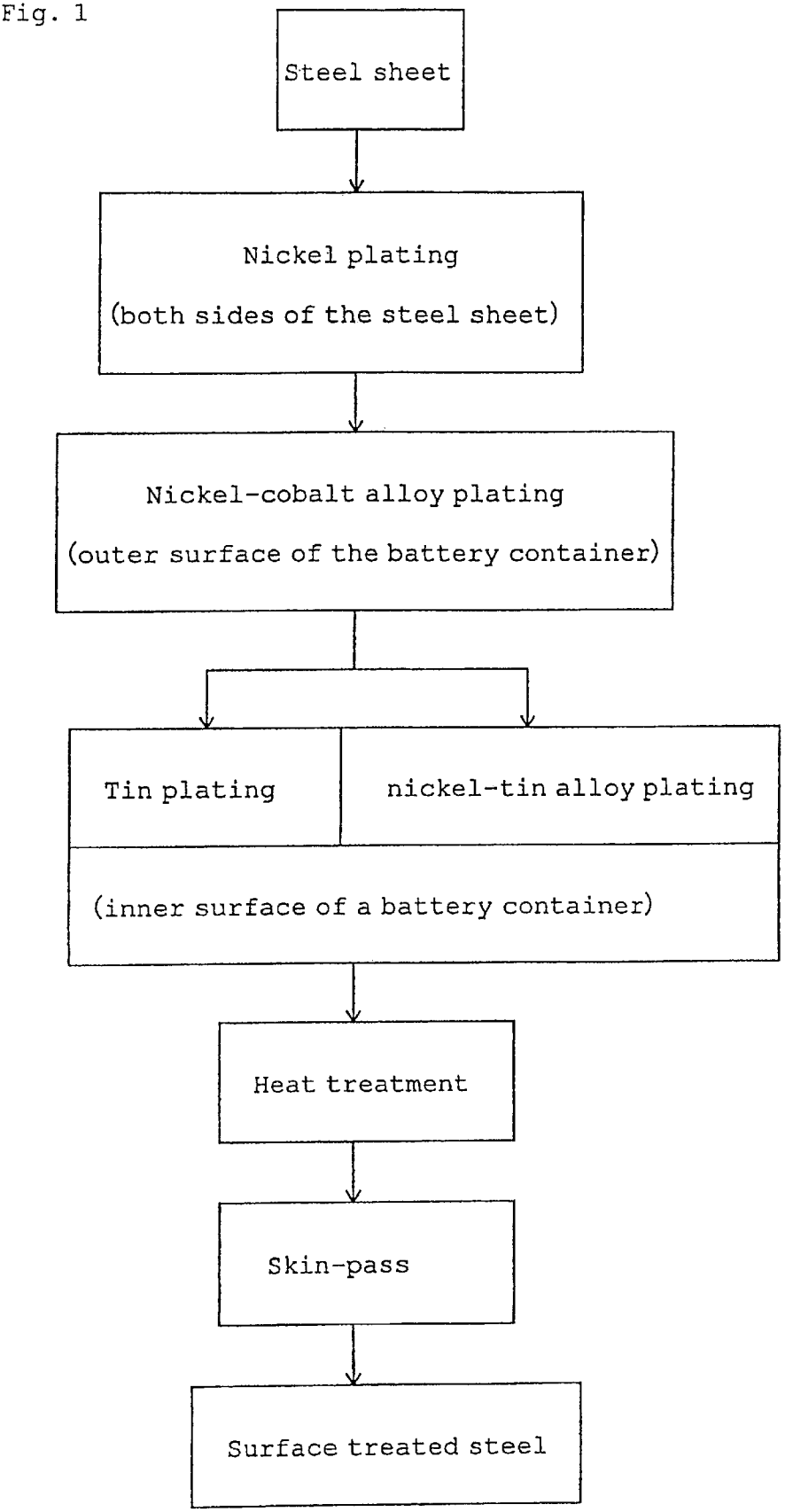
FIG. 1 shows the manufacturing process of the surface treated steel sheet of the present invention.

A surface treated steel sheet of the present invention is explained below.

A surface treated steel sheet of the present invention has the different structure of the surface treated layer on the side to be the inner surface of a battery container and that to be the outer surface of it. First, the structure of the surface treated layer of the surface to be the inner surface of a battery container is explained in detail. A nickel-tin diffusion layer or a iron-nickel-tin diffusion layer is formed on the surface to be the inner surface. The formation of these diffusion layers on the inner surface of a battery container can reduce the internal resistance and improve the battery performance.

The thickness of the above-mentioned nickel-tin diffusion layer or iron-nickel-tin diffusion layer is preferably 0.15 to 3.0 $\mu$m, more preferably 0.2 to 2.0 $\mu$m. When it is less than 0.15 $\mu$m, the internal resistance of a battery can not be reduced. On the other hand, when it exceeds 3.0 $\mu$m, the improvement of the adhesion to the positive electrode mix is saturated, which is not economical.

In order to form a nickel-tin diffusion layer, nickel tin alloy is plated or nickel is plated and subsequently tin is plated followed by heat treatment. In addition, it is favorable to form a nickel layer or an iron-nickel diffusion layer under the nickel-tin diffusion layer in order to improve the corrosion resistance of the entire surface treated steel sheet. The thickness of these layers are not particularly defined, but they are preferably 3 $\mu$m or less from an economical viewpoint.

Next, a nickel-cobalt layer is formed on the outermost surface of the surface treated layer of the side to be the outer surface of a battery container for the following reason. Namely, it is because that a nickel-cobalt diffusion layer has superior powdering quality and formability by DI forming and DTR forming compared to the conventional nickel layer alone.

Next, the manufacturing process of a surface treated steel sheet of the present invention is explained referring to FIG. 1.

(Steel sheet)

In general, a low carbon aluminum killed steel sheet is favorably used as a substrate for plating. A non-aging hyper low carbon steel sheet including niobium, boron or titanium is also available. A steel strip electrolytically degreased, annealed and skin-passed after cold rolling is usually used as a substrate.

(Nickel plating)

After the pre-treatment consisting of electrolytical degreasing, rinsing, pickling in sulfuric acid or hydrochloric acid (electrolytical or dipping) and rinsing is carried on the above-mentioned steel substrate, nickel is plated on both sides of the steel sheet. Since the nickel plating is diffused by the post heat treatment, the conventional problem can be solved. In the present invention, any of known Watt bath, sulfamic acid bath or chloride bath may be used. In addition, any of non-gloss plating, semi-gloss plating or gloss plating may be used. The sulfur content involved in the brightener is removed during the post heat treatment.

The plating thickness can be different on either side. The thickness of the nickel plating is 0.5 to 5 $\mu$m, preferably 1 to 4 $\mu$m.

When the above-mentioned thickness of the nickel plating is less than 0.5 $\mu$m, many pin-holes are formed in the nickel plating layer, which causes the increasing dissolving of iron (steel sheet) into alkali solution that is packed in the battery container and the formation of iron oxide, and it is unfavorable. Furthermore, it increases the deterioration of the corrosion resistance at the outer surface of the battery container, and it is also unfavorable. On the other hand, when the thickness exceeds 5 $\mu$m, the effect is saturated, and it is uneconomical.

Next, the formation of a nickel-cobalt alloy plating layer in the above-mentioned battery container and the surface treated steel sheet is explained. When cobalt sulfate is added into Watt bath or sulfamic acid bath, a surface treated layer in which cobalt co-deposits with nickel is formed.

Incidentally, the suitable cobalt content of the nickel-cobalt alloy plating is from 0.5% to 10%. When the cobalt content is less than 0.5%, it is not effective for improving the powdering quality of nickel-cobalt diffusion layer formed by the post diffusion treatment. On the other hand, when the cobalt content is exceeds 10%, it is uneconomical because the improving effect is saturated and also because cobalt is an expensive precious metal.

(Tin plating)

After the afore-mentioned plating, tin is placed onto the side of the steel sheet to be the inner surface of a battery container. The bath composition can be any of the usual acid bath or alkali baths, and a stannous sulfate bath or a phenol-sulfonic acid bath is preferably used in the present invention.

In the formation of the tinplating layer, the amount of tin plating is determined from the following view point. Namely, all the tin plating layer should be changed into a nickel-tin diffusion layer by the heat treatment which forms a nickel-tin diffusion layer in the present invention. This is because when the layer of tin remains, tin dissolves into alkali solution which is an electrolyte of an alkali battery, which generates hydrogen and possible deteriorates the battery performance.

When heated at 700° C. or less in the heat treatment process, nickel-tin alloy is mainly composed of $Ni_3Sn$, $Ni_3Sn_2$ and $Ni_3Sn_4$.

The above-mentioned method is the one in which a nickel-tin diffusion layer is formed comprising forming a tin plating layer after forming nickel plating layer followed by heat treatment.

There is another second method comprising directly forming a nickel-tin alloy plating layer on the steel sheet followed by heat treatment.

Next, the steel substrate on which nickel-tin alloy plating is formed is selected from the following two types.

① cold rolled steel sheet
② steel sheet previously plated with nickel

There are 2 methods in which nickel-tin diffusion layer is formed as mentioned above. In the present invention, disregarding the adoption of either method, the heat treatment should be carried out after plating.

This is because the formation of the diffusion layer involving nickel and tin can reduce the internal resistance at the inner surface of the battery container.

Next, the latter method of nickel-tin alloy plating (another method in which the diffusion layer is formed after alloy plating) is explained in detail.

Chloride-fluoride bath or pyro-phosphoric acid bath is adopted as the plating bath for nickel-tin alloy plating. The thickness of the nickel-tin alloy plating is preferably 0.15 to 3.0 $\mu$m.

(Heat treatment)

The post heat treatment is practiced in order to form a diffusion layer. The heat treatment is preferably practiced under the non oxidizing or reducing protective gas atmosphere in order to prevent the formation of an oxide film on the surface. The diffusion layer is formed at 300° C. or more. The heating duration ranges from 30 seconds to 15 hours.

Batch annealing or continuous annealing are available for the heat treatment of the steel sheet in the present invention. The heating conditions are preferably 30 seconds to 5 minutes at 600 to 850° C. for continuous annealing and 5 to 15 hours at 300 to 650° C. for batch annealing. Furthermore, a diffusion layer of iron-nickel-tin (3 components) can also be formed between the steel substrate, nickel plating layer and tin plating layer in the present invention. In this case, tin plating layer is formed on the nickel plating layer after nickel plating followed by heating at a higher temperature for a longer duration, in which 3 components diffuse each other.

(Skin-pass)

Skin-pass is practiced for the purpose of preventing the stretcher-strain caused by the heat treatment after nickel plating. Another purpose of the practice of skin-pass is to obtain the surface roughness or the surface appearance such as bright finish or dull finish. As it is the last finish-rolling, they can be controlled by selecting the work roll having various surface roughness in the skin-pass.

(Explanation of a battery container)

Next, the manufacturing of the battery container using the above-mentioned surface treated steel sheet is explained.

The battery container of the present invention is manufactured by press-forming the surface treated steel sheet manufactured as mentioned above into cylindrical shape.

The inventors of the present invention found out that when the above-mentioned surface treated steel sheet was applied to a battery container for an alkali battery, the more excellent battery performance could be obtained compared to that using the usual battery container.

(Composition of the outer surface of a battery container)

In the present invention, a nickel-cobalt diffusion layer is formed on the outermost surface of the surface treated layer of the outer surface of a battery container. The formation of the nickel-cobalt diffusion layer on the outermost surface can suppress the powdering when it is press-formed in comparison with the case where the surface treated steel sheet covered with a conventional single layer of nickel plating is press-formed. Furthermore, nickel-cobalt diffusion layer has excellent corrosion resistance.

In addition, a nickel layer is favorably formed under the nickel-cobalt diffusion layer in the present invention. It is favorable to form the nickel layer because it further can improve the corrosion resistance of the nickel-cobalt diffusion layer and also improve the whole outer surface of the battery container.

The thickness of the nickel-cobalt diffusion layer formed on the outer surface of the battery container is preferably 0.1 to 1 $\mu$m, more preferably 0.2 to 0.6 $\mu$m.

EMBODIMENT

The present invention is explained in more detail showing embodiments below.

EXAMPLE 1

A low carbon steel sheet after cold rolling and annealing having thickness of 0.25 mm was used as a substrate for plating. The chemical composition of the substrate is as follows:

C: 0.04% (% means weight %, the same hereinafter), Mn: 0.19%, Si: 0.01%, P: 0.012%, S: 0.009%, Al: 0.064% and N: 0.0028%.

The above-mentioned steel sheet was electrolytic ally degreased in the alkali solution on the following conditions.
(Alkali degreasing)
Condition of the electrolysis:

| Bath composition: | Caustic soda 30 g/l |
| --- | --- |
| Current density: | 5 A/dm$^2$ (anodic treatment) × 10 seconds |
|  | 5 A/dm$^2$ (cathodic treatment) × 10 seconds |
| Bath temperature: | 70° C. |

After that, pickling in the sulfuric acid (sulfuric acid 50 g/l, bath temperature 30° C., dipping for 20 seconds) was practiced, and then nickel plating was carried out on the conditions described below.
(Nickel plating)

| Bath composition: | |
| --- | --- |
| nickel sulfate | 320 g/l |
| boric acid | 30 g/l |
| nickel chloride | 40 g/l |
| Sodium lauryl-sulfate | 0.5 g/l |
| Bath temperature: | 55 ± 2° C. |
| pH: | 4.1 to 4.6 |
| Stirring: | air bubbling |
| Current density: | 10 A/dm$^2$ |
| Anode: | nickel pellets (nickel pellets were packed in a titanium basket and the titanium basket was covered with a polypropylene bag) |

Non-gloss plating was formed on both sides of the steel substrate on the above conditions. The thickness of the nickel plating was varied by changing electrolysis duration on the conditions mentioned above. The samples having differential thickness of plating on either side were also prepared.

(Nickel-cobalt alloy plating)
Cobalt was involved in the nickel plating layer using a sulfamic acid bath added by cobalt sulfate in several quantity.

| Bath composition: | |
| --- | --- |
| nickel sulfamide Ni(NH$_2$SO$_3$).4H$_2$O | 600 g/l |
| nickel chloride NiCl$_2$ | 10 g/l |
| cobalt sulfate CoSO$_4$.6H$_2$O | 5 to 20 g/l |
| boric acid H$_3$BO$_3$ | 40 g/l |
| citric acid | 0.6 g/l |
| saccharin | 0.5 g/l |
| pH: | 4 (controlled by addition of sulfamic acid) |
| Stirring: | air bubbling |
| Bath temperature: | 60° C. |
| Cathodic current density: | 10 A/dm$^2$ |
| Anode: | S pellets (brand name of INCO Inc., granular) were packed in a titanium basket, and the titanium basket was covered with a polypropylene bag. |

The cobalt content in the plating and the thickness of the plating were varied by changing the quantity of added cobalt sulfate and the electrolysis duration on the conditions mentioned above.
(Tin plating)
After nickel-cobalt plating, tin plating layer was formed on the opposite side using stannous sulfate bath on the following conditions.

| Bath composition: | |
| --- | --- |
| stannous sulfate | 30 g/l |
| phenol-sulfonic acid | 60 g/l |
| ethoxyrated α naphthol | 5 g/l |
| Bath temperature: | 55 ± 2° C. |
| Current density: | 10 A/dm$^2$ |
| Anode: | tin board |

The several kinds of samples having varied thickness of tin plating were prepared changing electrolysis duration on the conditions mentioned above.
(Heat treatment)
Next, the heat treatment was practiced to form a diffusion layer on the following conditions.
Protective gas: comprising 6.5% of hydrogen and the reminder of nitrogen dew point −55° C.

The several kinds of the surface treated steel sheet were prepared varying the soaking temperature and the soaking period of time. The thickness of the plating layer and the diffusion layer were measured with GDS (glow discharge atomic emission spectrometry).

The surface analysis of the samples which were heat-treated after tin was plated on nickel plating layer by X-ray diffraction analysis and GDS (glow discharge atomic emission spectrometry) revealed the formation of the nickel-tin layer.

EXAMPLE 2

The following nickel plating was formed on both sides of the same steel substrate as that of Example 1. After that, nickel-cobalt alloy was plated on the side to be the outer surface of the battery container on the same conditions as those of Example 1, and tin was plated on the side to be the inner surface of a battery container on the same conditions as those of Example 1. Subsequently, the surface treated steel sheet was completed practicing heat treatment and skin-pass rolling.

Nickel-tin alloy involving 28% of tin was used as the anode.

The samples having several thickness of the nickel-tin alloy plating were prepared varying electrolysis duration and subsequent heat treatment was practiced as in Example 1. These results are shown in Table 1.

TABLE 1

| | | Variety of plating and plating thickness ($\mu$m) | | Heat treatment after plating | | Variety of diffusion layer and its thickness ($\mu$m) | | |
|---|---|---|---|---|---|---|---|---|
| | Claim No | | | Temperature (° C.) | Heating period (minute) | Uppermost layer | Intermediate layer | Lowermost layer |
| Example | 1 | IN* | Ni(1.5) → Ni—Sn(2.9) | 600 | 360 | Fe—Ni—Sn(5.5) | | |
| | | OUT* | Ni(2.3) → Ni—Co(0.1) | | | Fe—Ni—Co(3.2) | | |
| | 2 | IN | Ni(2.9) → Sn(2.6) | 400 | 300 | Ni—Sn(2.9) | | Ni(2.9) |
| | | OUT | Ni(2.9) → Ni—Co(0.2) | | | Ni—Co(0.5) | | Ni(2.6) |
| | 3 | IN | Ni(2.1) → Sn(0.1) | 550 | 360 | Ni—Sn(0.15) | Ni(0.42) | Fe—Ni(1.8) |
| | | OUT | Ni(2.3) → Ni—Co(0.3) | | | Ni—Co(0.3) | Ni(2.0) | Fe—Ni(1.2) |
| | 4 | IN | Ni(0.5) → Sn(0.4) | 300 | 360 | Ni—Sn(0.6) | | Fe—Ni(0.6) |
| | | OUT | Ni(1.0) → Ni—Co(0.1) | | | Ni—Co(0.2) | | Fe—Ni(1.2) |
| | 5 | IN | Ni(1.9) → Sn(0.9) | 600 | 360 | Ni—Sn(0.8) | Fe—Ni—Sn(0.4) | Fe—Ni(3.0) |
| | | OUT | Ni(4.0) → Ni—Co(0.5) | | | Ni—Co(1.5) | Fe—Ni—Co(0.5) | Fe—Ni(3.0) |

Remarks * IN: Inner surface OUT: Outer surface (Nickel plating)

| Bath composition: | |
|---|---|
| nickel sulfate | 300 g/l |
| boric acid | 30 g/l |
| nickel chloride | 45 g/l |
| Sodium lauryl-sulfate | 0.5 g/l |
| Bath temperature: | 50 ± 2° C. |
| pH: | 4.0 to 4.5 |
| Stirring: | air bubbling |
| Current density: | 15 A/dm$^2$ |

The samples having several thickness of the nickel plating were prepared varying electrolysis duration and subsequent heat treatment was practiced as in Example 1.

EXAMPLE 3

(Nickel-tin alloy plated example)

Nickel was plated on both sides of the same steel substrate as that of Example 1 on the same conditions as those of Example 1, and then nickel-cobalt alloy was plated on the one side of the steel substrate on the same conditions as those of Example 1. After that, nickel-tin alloy was plated on the one side of the steel substrate using chloride-fluoride bath. The conditions of nickel-tin alloy plating are as follows.

| Bath composition: | |
|---|---|
| stannous chloride | 50 g/l |
| nickel chloride | 300 g/l |
| sodium fluoride | 30 g/l |
| acid ammonia fluoride | 35 g/l |
| Bath temperature: | 65° C. |
| pH: | 4.5 |
| Stirring: | air bubbling |
| Current density: | 4 A/dm$^2$ |

(Manufacturing of battery container)

As for the battery container formed by the DI forming method, the above-mentioned plated steel sheet having the thickness of 0.38 mm was punched out into a blank 41 mm in diameter, drawn into a cup 20.5 mm in diameter, and then formed into 13.8 mm in outside diameter, 0.20 mm in container wall thickness and 56 mm in height by redrawing and two-step ironing using DI forming machine. Finally, the upper part was trimmed off to shape a LR-6 type battery container 13.8 mm in outside diameter, 0.2 mm in container wall and 49.3 mm in height. On the other hand, as for the battery container formed by the DTR forming method, the plated steel sheet 0.25 mm in sheet thickness was punched out into a blank 58 mm in diameter, and then shaped into a LR-6 type battery container 13.8 mm in outside diameter, 0.20 mm in container wall thickness and 49.3 mm in height by several times of drawing and redrawing.

(Production of battery)

After manufacturing battery container as described above, LR-6 type alkali-manganese battery was produced as follows.

At first, positive electrode mix was prepared mixing manganese dioxide and graphite at the 10:1 by weight ratio and adding potassium hydroxide (8 mole) to them. After that, the positive electrode mix was pressed in the die and shaped into a doughnut shaped positive electrode mix pellet having prescribed dimensions, and then it was pressed and fitted into the battery container. Then, the battery container was formed by necked-in forming at just below the open edge portion of it in order to fit a negative electrode board on which a negative electrode collector rod into the battery container.

After that, a separator made of unwoven vinlyon cloth was inserted along the inner circuit of the pellet pressed and fitted into the battery container, and then negative electrode gel composed of zinc granules and potassium hydroxide saturated with zinc dioxide was inserted into the battery container. After that, the negative electrode board fitted with an insulating gasket was inserted into the battery container, and then it was calked around the open edge portion of the battery container.

In case where graphite is coated on the inner surface of the battery container, graphite 80 parts (by weight) and thermosetting epoxy resin 20 parts (by weight) are mixed and diluted with methyl-ethyl ketone, and then it is air-sprayed onto the inner surface of the battery container followed by drying at 150° C. for 15 minutes.

(Evaluation of powdering quality)

Furthermore, the powdering quality was evaluated in the three forming methods, which are drawing, DI forming and DTR forming, in order to evaluate the continuous productivity of the battery container.

The powdering quality was evaluated by the decrease in weight at the following weight measurements of (1) and (2) after forming in the manufacturing process of the above-mentioned battery container. The process comprised blanking→cupping→degreasing→weight measurement (1)→forming→degreasing→weight measurement (2).

Furthermore, the whole evaluation of powdering quality was evaluated by observing the mass of powder fallen off from the plating, that was glued to a cellophane tape after the lubricant on the inner and the outer surfaces of the battery container was rejected by organic solvent, using a microscope of 25 magnification.

Degreasing was conducted by alkali dipping degreasing followed by ultrasonic cleaning in acetone.

Since the error might be large if the weight decrease was measured every one container, 30 of them as one measurement unit were repeated three times. Table 2 shows the result.

using the conventional multistage drawing. Therefore, it can preferably be used, also.

(Industrial possibility)

In the battery container as claimed in claim 1 to 6, the low internal resistance is revealed on the inner surface, and powdering can remarkably be reduced during the forming by DI or DTR, which can suppress the scratch occurrence by metal contact, prolong the life span of the die, and improve the continuous productivity of the battery container.

In the surface treated steel sheet as claimed in claim 7 to 11, they can be used as the material for the battery container as claimed in claim 1 to 6.

Moreover, in the battery of the present invention using them, excellent battery performance such as low internal resistance and large short circuit current can be obtained.

What is claimed is:

1. In a battery container having an inner diffusion layer formed on the inner surface thereof and an outer diffusion layer formed on the outer surface thereof, the improvement wherein said inner diffusion layer consists of:
    a) an iron-nickel-tin diffusion layer;
    wherein said outer diffusion layer is selected from the group consisting of:
      1) an iron-nickel-cobalt diffusion layer;
      2) an uppermost nickel-cobalt diffusion layer and a nickel layer formed thereunder as the lowermost layer;
      3) an uppermost nickel-cobalt diffusion layer, a nickel layer formed thereunder as the intermediate layer, and an iron-nickel diffusion layer formed thereunder as the lowermost layer;

TABLE 2

| Example | Claim No | Variety of diffusion layer on outer surface of battery container | Thickness of steel sheet | Forming method of battery container | Powdering quality (mg/30 case) | Internal resistance on inner surface of battery container (m Ω) |
| --- | --- | --- | --- | --- | --- | --- |
| 1 | 1 | Fe—Ni—Co | 0.38 | DI | 26 | 98 |
| 2 | 2 | Uppermost layer Ni—Co | 0.25 | DTR | 23 | 98 |
| 3 | 3 | Uppermost layer Ni—Co | 0.38 | DI | 27 | 97 |
| 4 | 4 | Uppermost layer Ni—Co | 0.25 | DTR | 30 | 96 |
| 5 | 5 | Uppermost layer Ni—Co | 0.38 | DI | 32 | 95 |
| Comparative Example | 1 | (Ni plating) | 0.38 | DI | 115 | 125 (Ni plating) |
| | 2 | (Ni plating) | 0.25 | DTR | 160 | 122 (Ni plating) |

As is apparent in Table 2, while in the comparative example 1 and 2, which were formed using a surface treated steel sheet of which one side to be the outer surface of a battery container was covered with mono layer of nickel plating, a large number of powders fell off from the containers (from 74 to 160 mg/30 containers), in the examples of the present invention, a small number of powders fell off (from 23 to 33 mg/30 containers). This shows that the battery container of the present invention is excellent in powdering quality.

By the way, in the present invention, the powdering quality and the anti-scratch quality can be improved not only using DI forming or DTR forming, which are the methods to reduce the wall thickness of a battery container, but also 4) an uppermost nickel-cobalt diffusion layer and an iron-nickel diffusion layer formed thereunder as the lowermost layer;
   5) an uppermost nickel-cobalt diffusion layer, an iron-nickel-cobalt diffusion layer formed thereunder as an intermediate layer, and an iron-nickel diffusion layer formed thereunder as the lowermost layer.

2. A battery container according to claim 1 which is manufactured using drawing, DI forming or DTR forming.

3. A battery using a battery container as claimed as claim 1 into which positive electrode mix and negative active material are packed.

4. A surface treated steel sheet for a battery container having a first diffusion layer formed on one side thereof and which is intended to be the inner surface of the battery container, and a second diffusion layer formed on the other side thereof and which is intended to be the outer surface of the battery container, wherein said first diffusion layer consists of:

a) an iron-nickel-tin diffusion layer;

wherein said second diffusion layer is selected from the group consisting of:
1) an iron-nickel-cobalt diffusion layer;
2) an uppermost nickel-cobalt diffusion layer and a nickel layer formed thereunder as the lowermost layer;
3) an uppermost nickel-cobalt diffusion layer, a nickel layer formed thereunder as the intermediate layer, and an iron-nickel diffusion layer formed thereunder as the lowermost layer;
4) an uppermost nickel-cobalt diffusion layer and an iron-nickel diffusion layer formed thereunder as the lowermost layer; and
5) an uppermost nickel-cobalt diffusion layer, an iron-nickel-cobalt diffusion layer formed thereunder as an intermediate layer, and an iron-nickel diffusion layer formed thereunder as the lowermost layer.

5. A surface treated steel sheet in accordance with claim 4, wherein said first diffusion layer is formed of an iron-nickel-tin diffusion layer and said second diffusion layer is formed of an iron-nickel-cobalt diffusion layer.

* * * * *